(12) United States Patent
Jiao et al.

(10) Patent No.: US 8,203,564 B2
(45) Date of Patent: Jun. 19, 2012

(54) EFFICIENT 2-D AND 3-D GRAPHICS PROCESSING

(75) Inventors: Guofang Jiao, San Diego, CA (US);
Angus M. Dorbie, San Diego, CA (US);
Yun Du, San Diego, CA (US); Chun Yu,
San Diego, CA (US); Jay C. Yun,
Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 944 days.

(21) Appl. No.: 11/675,662

(22) Filed: Feb. 16, 2007

(65) Prior Publication Data

US 2008/0198168 A1 Aug. 21, 2008

(51) Int. Cl.
*G06T 1/20* (2006.01)
*G06T 1/00* (2006.01)
*G06T 15/40* (2011.01)

(52) U.S. Cl. .................. 345/506; 345/501; 345/421

(58) Field of Classification Search .............. 345/501, 345/506, 530, 419, 421, 423, 426, 427, 602, 345/604

See application file for complete search history.

(56) References Cited

U.S. PATENT DOCUMENTS

| | | | | |
|---|---|---|---|---|
| 5,966,134 A * | 10/1999 | Arias | | 345/589 |
| 6,057,852 A * | 5/2000 | Krech, Jr. | | 345/589 |
| 6,115,733 A * | 9/2000 | Oberman et al. | | 708/654 |
| 6,243,488 B1 * | 6/2001 | Penna | | 382/154 |
| 6,459,428 B1 * | 10/2002 | Burk et al. | | 345/419 |
| 6,535,218 B1 * | 3/2003 | Schlapp | | 345/545 |
| 6,597,356 B1 * | 7/2003 | Moreton et al. | | 345/423 |
| 6,693,644 B1 * | 2/2004 | Moriwaki et al. | | 345/604 |
| 6,707,453 B1 * | 3/2004 | Rossin et al. | | 345/426 |
| 6,924,808 B2 * | 8/2005 | Kurihara et al. | | 345/506 |

(Continued)

FOREIGN PATENT DOCUMENTS

EP 1511002 3/2005

(Continued)

OTHER PUBLICATIONS

Kato, Y., Hamada, M., Inoue, Y., Jul. 2006, Multithread Shader for 3D and Vector Graphics, ACM SIGGRAPH 2006 Research posters, Article No. 64.*

(Continued)

*Primary Examiner* — Joni Hsu
(74) *Attorney, Agent, or Firm* — George Christ Pappas; James R. Gambale, Jr.

(57) ABSTRACT

Techniques for supporting both 2-D and 3-D graphics are described. A graphics processing unit (GPU) may perform 3-D graphics processing in accordance with a 3-D graphics pipeline to render 3-D images and may also perform 2-D graphics processing in accordance with a 2-D graphics pipeline to render 2-D images. Each stage of the 2-D graphics pipeline may be mapped to at least one stage of the 3-D graphics pipeline. For example, a clipping, masking and scissoring stage in 2-D graphics may be mapped to a depth test stage in 3-D graphics. Coverage values for pixels within paths in 2-D graphics may be determined using rasterization and depth test stages in 3-D graphics. A paint generation stage and an image interpolation stage in 2-D graphics may be mapped to a fragment shader stage in 3-D graphics. A blending stage in 2-D graphics may be mapped to a blending stage in 3-D graphics.

30 Claims, 9 Drawing Sheets

U.S. PATENT DOCUMENTS

| | | | |
|---|---|---|---|
| 7,425,955 B2* | 9/2008 | Long et al. | 345/421 |
| 7,450,124 B2 | 11/2008 | Burch et al. | |
| 7,486,255 B2* | 2/2009 | Brown et al. | 345/7 |
| 7,570,267 B2 | 8/2009 | Patel et al. | |
| 2003/0174133 A1 | 9/2003 | Shehane et al. | |
| 2006/0087508 A1* | 4/2006 | Drexler et al. | 345/427 |
| 2007/0146366 A1* | 6/2007 | Seetharamaiah et al. | 345/443 |

FOREIGN PATENT DOCUMENTS

| | | |
|---|---|---|
| JP | 11510630 T | 9/1999 |
| JP | 2001357410 A | 12/2001 |
| KR | 20060044935 A | 5/2006 |
| KR | 20060101223 A | 9/2006 |

OTHER PUBLICATIONS

"OpenVG Specification, Version 1.0," Version 1—Aug. 1, 2005, Amended Jan. 26, 2007, The Khronos Group.

The OpenGL Graphics System: A Specification (Version 2.0—Oct. 22, 2004), Silicon Graphics, Inc.

Anonymous: "AmanithVG—The project" Internet Article, [Online] Feb. 10, 2007, XP002539627 Retrieved from the Internet: URL:http://web.archive.org/web/20070210093439/www.amanithvg.com/project.html >.

C. Campbell: "Behind the Graphics2D: The openGL-based pipeline" JAVA.NET The Source for Java Technology Collaboration, [Online] Dec. 11, 2004, pp. 1-4, XP002539628 Retrieved from the Internet: URL:http://today.java.net/cs/user/print/a/147>.

International Search Report and Written Opinion—PCT/US2008/054162, International Search Authority—European Patent Office—Sep. 9, 2009.

S. Conversy and J-D. Fekete: "The svgl toolkit: enabling fast rendering of rich 2D graphics" Technical Report-Ecole Des Mines De Nantes, No. 02/01/info, 2002, pp. 1-11, XP002539626 France.

Picinardi A., "Rendering di primitive OpenVG mediante pipeline OpenGLIES 1.1", Dissertation presented to the faculty of engineering of the Universita degli studi di Bergamo, Academic year 2005/2006.

Taiwan Search Report—TW097105492—TIPO—Jun. 27, 2011.

Yoshiyuki Kokojima et al., "Resolution Independent Rendering of Deformable Vector Objects using Graphics Hardware," Proceedings of the Joint Symposium on Visual Computing/Graphics and CAD of the Institute of Image Electronics Engineers of Japan, Jun. 22, 2006, pp. 17-22.

* cited by examiner

EFFICIENT 2-D AND 3-D GRAPHICS PROCESSING

BACKGROUND

I. Field

The present disclosure relates generally to electronics, and more specifically to techniques for performing graphics processing.

II. Background

Graphics processing units (GPUs) are specialized hardware units used to render 2-dimensional (2-D) or 3-dimensional (3-D) images for various applications such as video games, graphics, computer-aided design (CAD), simulation and visualization tools, imaging, etc. The process to render a 2-D drawing typically includes a series of stages that is specific to 2-D graphics. The processing for these 2-D graphics stages may be computationally intensive. A 2-D GPU may be designed and used to perform computationally intensive 2-D processing in hardware. The use of the 2-D GPU may shorten rendering time for 2-D drawings and improve overall performance.

Similarly, the process to render a 3-D image typically includes a series of stages that is specific to 3-D graphics. The processing for these 3-D graphics stages may also be computationally intensive. A 3-D GPU may be designed and used to perform computationally intensive 3-D processing in hardware. The use of the 3-D GPU may shorten rendering time for 3-D images and improve overall performance.

An electronics device may support only 2-D graphics and may utilize a 2-D GPU for 2-D graphics acceleration. An electronics device may also support only 3-D graphics and may utilize a 3-D GPU for 3-D graphics acceleration. For an electronics device that supports both 2-D and 3-D graphics, it is desirable to achieve good performance for both 2-D and 3-D graphics with as little hardware as possible in order to reduce cost and power consumption.

SUMMARY

Techniques for efficiently supporting both 2-D and 3-D graphics are described herein. A GPU may be designed to perform 3-D graphics processing in accordance with a 3-D graphics pipeline to render 3-D images. The GPU may also perform 2-D graphics processing in accordance with a 2-D graphics pipeline to render 2-D images or drawings. Each of a plurality of stages of the 2-D graphics pipeline may be mapped to at least one of a plurality of stages of the 3-D graphics pipeline. Processing units within the GPU may be efficiently used to perform processing for both 2-D and 3-D graphics.

In general, the 2-D graphics pipeline and 3-D graphics pipeline may each include any number of stages. The 2-D graphics pipeline stages may be mapped to the 3-D graphics pipeline stages based on various mapping schemes. For example, a clipping, masking and scissoring stage in 2-D graphics may be mapped to a depth test stage in 3-D graphics. Coverage values for pixels within paths in 2-D graphics may be determined using a rasterization stage, the depth test stage, etc., in 3-D graphics. A paint generation stage and an image interpolation stage in 2-D graphics may be mapped to a fragment shader stage in 3-D graphics. A blending stage in 2-D graphics may be mapped to a blending stage in 3-D graphics, and both blending stages may be supported with a plurality of blending modes. Other stages in 2-D graphics may be mapped to other stages in 3-D graphics as described below.

Various aspects and features of the disclosure are described in further detail below.

DETAILED DESCRIPTION

A GPU may support 2-D and/or 3-D graphics. 2-D graphics stores 2-D representation of geometric data that is processed to generate 2-D images or drawings. 3-D graphics stores 3-D representation of geometric data that is processed to generate 2-D images. 2-D graphics may be compared to painting whereas 3-D graphics may be compared to sculpting. 2-D and 3-D graphics may utilize different pipelines with different stages and graphics operations to generate final images for display.

A 2-D or 3-D image may be represented with primitives, which are basic units of geometry. For 3-D graphics, primitives may include polygons (typically triangles), lines, points, etc. Each triangle is defined by three vertices, and each line is defined by two vertices. Each vertex may be associated with various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a picture element (pixel). Texture coordinates are typically given by horizontal and vertical coordinates, u and v. A vertex may also be associated with other attributes. For 2-D graphics, primitives may include points, lines, curved lines, rectangles, etc. A path may be composed of a combination of different primitives. A 2-D or 3-D image may be rendered by computing attribute component values for pixels to be displayed.

Figure 1:
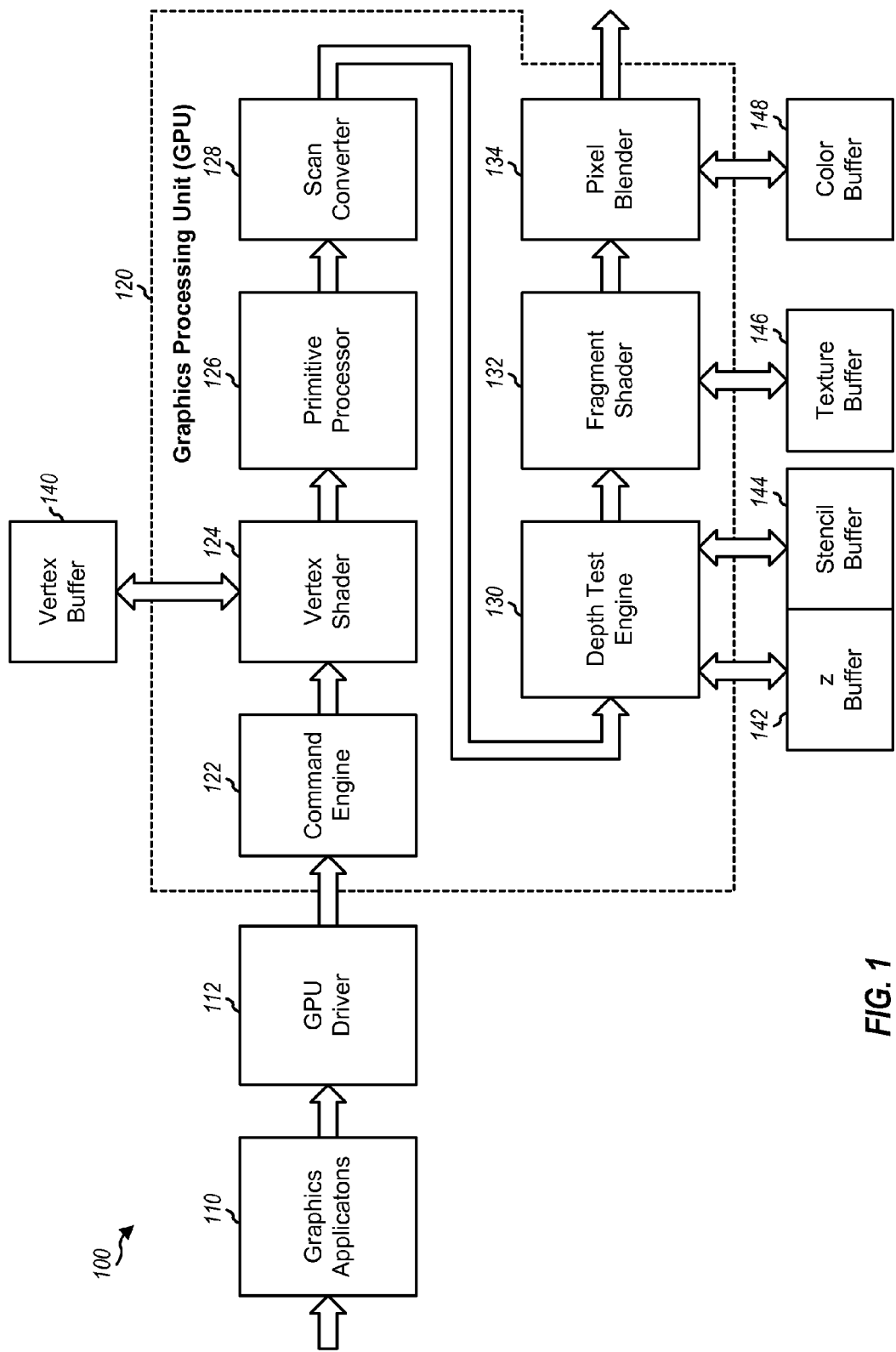
FIG. 1 shows a block diagram of a device that supports 3-D graphics.

FIG. 1 shows a block diagram of a design of a device 100 that supports 3-D graphics. Device 100 may support a 3-D software interface such as Open Graphics Library (OpenGL), Direct3D, etc. OpenGL is described in a document entitled "The OpenGL® Graphics System: A Specification," Version 2.0, dated Oct. 22, 2004, which is publicly available. Device 100 may be a stand-alone system or part of a larger system such as a computer, a wireless communication device, etc.

Graphics applications 110 may run concurrently and may be for video games, graphics, videoconference, etc. Graphics applications 110 generate high-level commands to perform graphics operations on graphics data. The high-level commands may be relatively complex but the graphics data may be fairly compact. The graphics data may include geometry information (e.g., information for vertices of primitives in an image), information describing what the image looks like, etc. Graphics applications 110 interface with a GPU driver 112 via application programming interfaces (APIs) (not shown in FIG. 1).

GPU driver 112 may be software and/or firmware executing on a processor, or a hardware unit, or a combination of both software/firmware and hardware. GPU driver 112 converts the high-level commands from graphics applications 110 to low-level commands, which may be machine dependent and tailored for processing units within a GPU 120. GPU driver 112 may also indicate where data is located, e.g., which buffers store the data. GPU 120 may split the processing of each graphics application into a series of threads, e.g., automatically and transparent to the graphics applications. A thread (or thread of execution) indicates a specific task that may be performed with a set of one or more instructions. For example, a thread may perform blending for a set of pixels. Threads allow a graphics application to have multiple tasks performed simultaneously by different processing units and further allow different graphics applications to share resources. GPU driver 112 provides the low-level commands for threads and data location indicators to GPU 120.

GPU 120 includes processing units that perform various functions to render 3-D images. The terms "processing unit", "engine", "core", "machine", "processor", "module", etc., are often used interchangeably. Within GPU 120, a command engine 122 receives the low-level commands from GPU driver 112 and/or fetches the commands from memory. Command engine 122 decodes the low-level commands and provides instructions to processing units affected by these commands.

A vertex shader 124 performs vertex processing on geometry data, which may comprise primitives such as triangles and lines. For example, vertex shader 124 may transform geometry from one coordinate system to another coordinate system, calculate light values for vertices of geometry, perform blending for geometry, etc. A vertex buffer 140 stores vertex information for vertex shader 124. A primitive processor 126 computes parameters for subsequent rasterization process. For example, primitive processor 126 may compute coefficients of linear equations for three edges of each triangle, depth (z) gradient for depth interpolation for pixels, etc. A scan converter 128 decomposes each primitive (e.g., triangle or line) into pixels and determines a screen coordinate for each pixel.

A depth test engine 130 may perform depth test (which is also called a z test) and/or stencil test for pixels, if enabled, to determine whether the pixels should be rendered or discarded. A z buffer 142 stores a depth or z value for each pixel location in the image being rendered. For depth test, engine 130 compares a z value for a pixel (the current z value) against a corresponding z value in z buffer 142 (the stored z value), passes the pixel and updates z buffer 142 and possibly stencil buffer 144 if the current z value is closer/nearer than the stored z value, and discards the pixel if the current z value is further back than the stored z value. A stencil buffer 144 stores a stencil value for each pixel location in an image being rendered. For stencil test, engine 130 compares a stored stencil value for a pixel against a reference value and either passes or discards the pixel based on an outcome of the comparison.

A fragment shader 132 (which may also be called a pixel shader) may perform various graphics operations on pixels and fragments. A fragment is a pixel and its associated information. Fragment shader 132 may compute parameters for interpolation of pixel attributes, e.g., coefficients of linear equations for attribute interpolation. Fragment shader 132 may then compute attribute component values for each pixel within each triangle based on the pixel's screen coordinate and using the interpolation parameters. Fragment shader 132 may also perform texture mapping, if enabled, to apply textures to each triangle. A texture image may be stored in a texture buffer 146. The three vertices of a triangle may be associated with three (u, v) coordinates in the texture image, and each pixel in the triangle may then be associated with specific texture coordinates in the texture image. Texturing is achieved by modifying the color of each pixel in the triangle with the color of the texture image at the location indicated by that pixel's texture coordinates. Fragment shader 132 may also perform texture filtering and/or other graphics operations.

A pixel blender 134 may perform graphics operations such as alpha blending, alpha test, fog blending, logic operation, dithering operation, etc., on fragments. Pixel blender 134 may provide results for a final image to a color buffer 148 for presentation on a display device (shown in FIG. 1).

As shown in FIG. 1, GPU 120 implements a 3-D graphics pipeline composed of multiple stages designed for 3-D graphics. GPU 120 may also implement other 3-D graphics pipelines with different stages and/or with the stages arranged in different manners. Buffers 140 through 148 may be implemented with memories that are external to GPU 120, as shown in FIG. 1. GPU 120 may include caches, which are high-speed memories, to store instructions and data for the processing units within the GPU.

Figure 2:
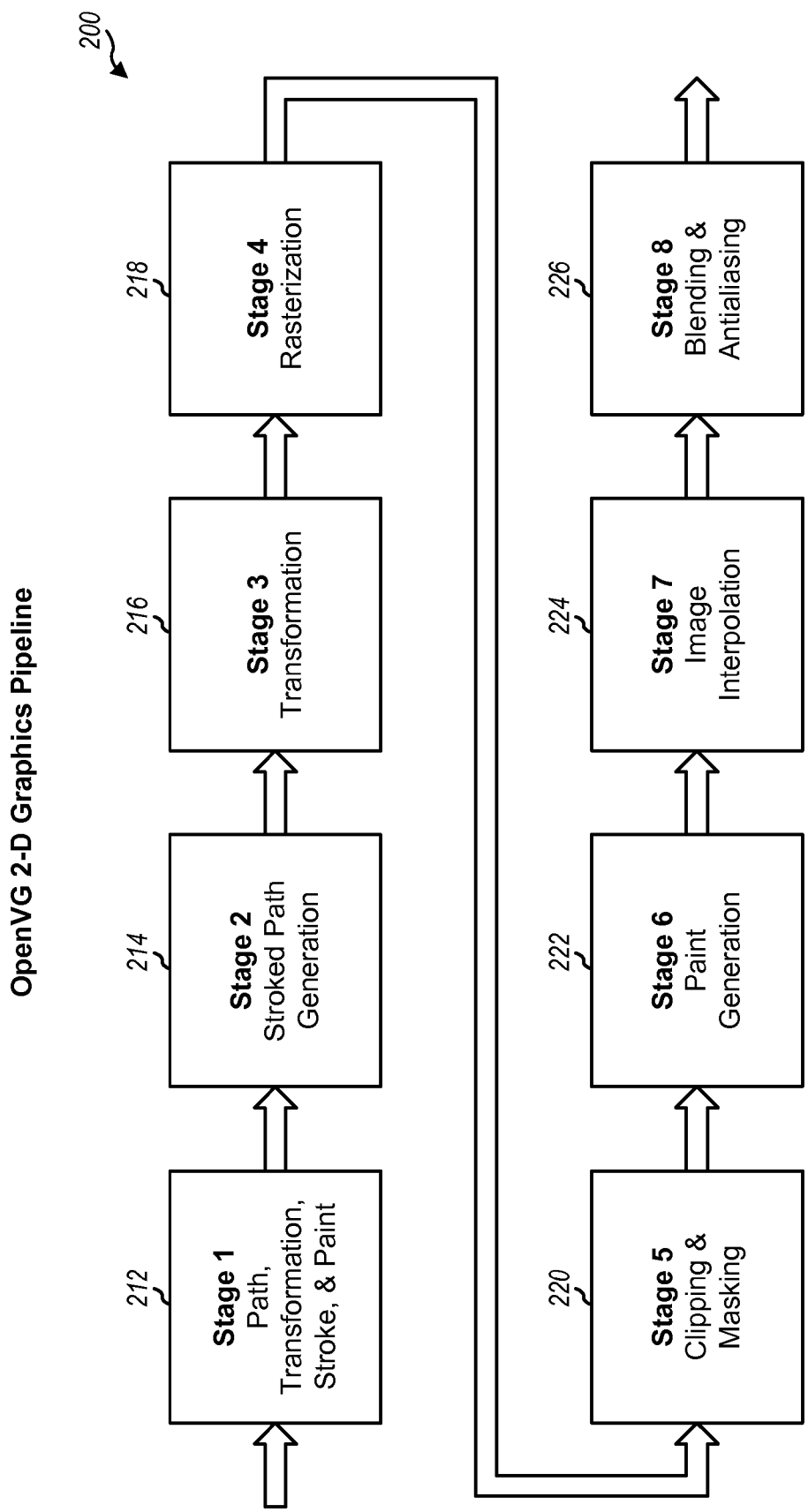
FIG. 2 shows a block diagram of a 2-D graphics pipeline in OpenVG.

FIG. 2 shows a block diagram of a 2-D graphics pipeline 200 described in "OpenVG Specification, Version 1.0," Jul. 28, 2005, which is publicly available and hereinafter referred to as OpenVG. OpenVG is a new standard for 2-D vector graphics and is suitable for handheld and mobile devices, e.g., cellular phones and gaming devices. A drawing in 2-D graphics is composed of paths, which are used to define geometry in the drawing. A path defines the duration of a pen or a paint brush over a drawing surface and may be stroked and/or filled. Stroke refers to defining the outline of a path's shape with lines. Fill refers to applying color, gradient, or texture to a shape's interior.

In block 212 for stage 1, a graphics application defines a path to be drawn and sets transformation, stroke, and paint parameters, if any, to be used by subsequent stages for the path. In block 214 for stage 2, the path is transformed from a user coordinate system to a screen coordinate system. The user coordinate system is a coordinate system used to represent geometry. The screen coordinate system is a coordinate system for a display screen. If the path is to be stroked, then the stroked parameters are applied in the user coordinate system to generate a new path that describes the stroked geometry in the screen coordinate system. This new path is referred to as the current path and is operated on by subsequent stages in the 2-D graphics pipeline. In block 216 for stage 3, path-to-surface transformation is applied to the geometry of the current path to generate screen coordinates. In block 218 for stage 4, a coverage value is computed for each pixel affected by the current path. A coverage value for a pixel indicates what fraction of that pixel's area is covered by the current path. The coverage value is used in subsequent stages to compute a color value for the pixel. Stage 4 maps the current path to pixels on the drawing surface.

In block 220 for stage 5, pixels that are not within the bounds of the drawing surface and, if scissoring is enabled, not within one or more scissoring regions are assigned coverage values of zero. The remaining processing is skipped for pixels with coverage values of zero. Stage 5 clips the drawing to the bounds of the drawing surface and any scissoring regions. The portions of the drawing that are clipped are discarded.

In block 222 for stage 6, a color value and an alpha value are defined for each pixel on the drawing surface based on the current relevant paint, which may depend on whether the path is being filled or stroked. Stage 6 applies a paint image to pixels in the current path. In block 224 for stage 7, if an image is being drawn, then a color value and an alpha value are computed for each pixel by interpolating image values using the inverse of an image-to-surface transformation. The results are combined with paint color and alpha values in accordance with the current image drawing mode. In block 226 for stage 8, source color and alpha values for each pixel from stage 7 are converted to destination color space and blended with the corresponding destination color and alpha values in accordance with a blending mode.

FIG. 2 shows a specific 2-D graphics pipeline. 2-D graphics may also be supported with other pipelines that may render 2-D images in other manners.

Device 100 in FIG. 1 may support 2-D graphics using units 112 through 134. These units may be designed for 3-D graphics, but their capabilities may be extended and used for 2-D graphics.

Figure 3:
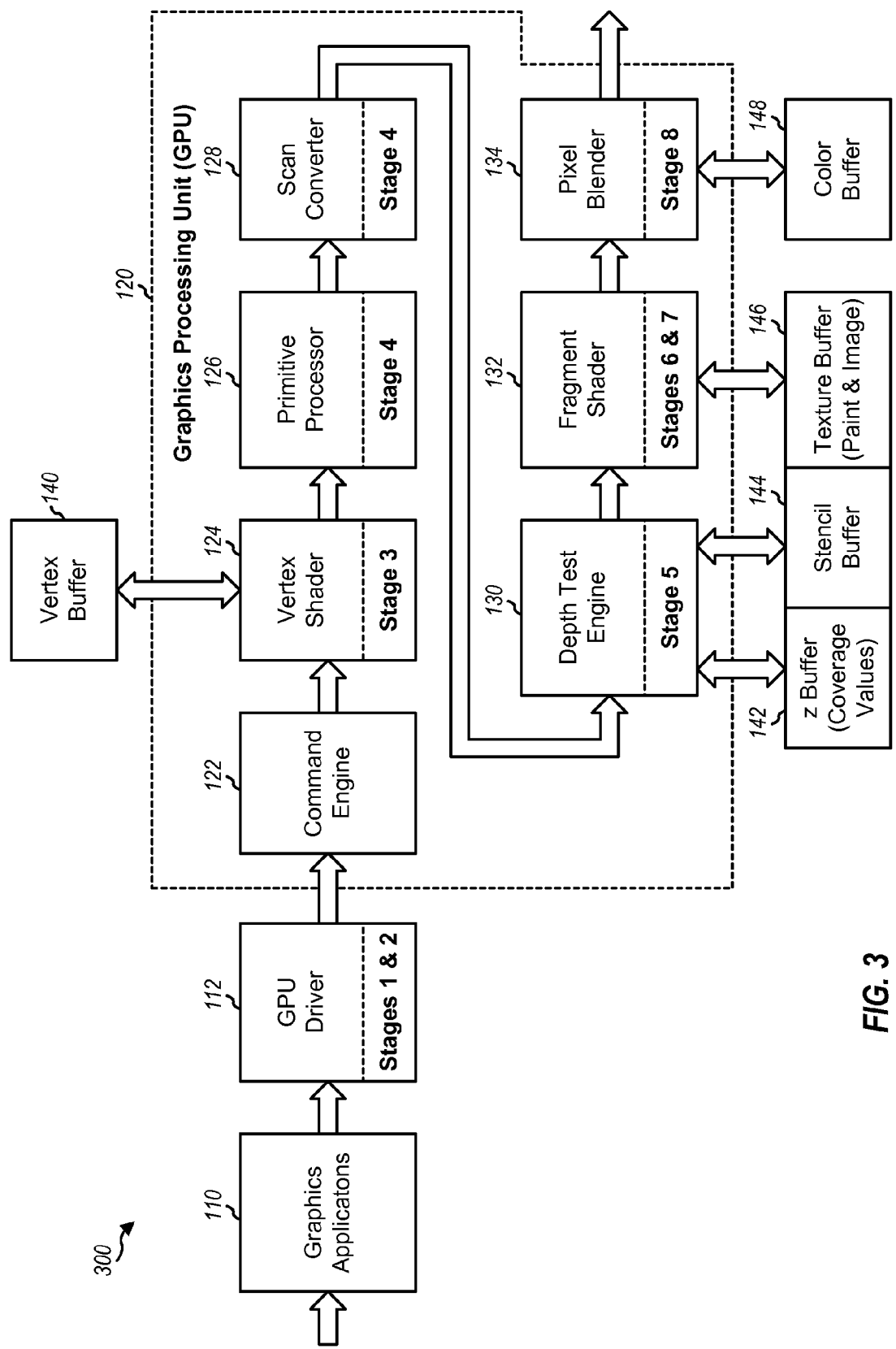
FIG. 3 shows use of the device in FIG. 1 to support 2-D graphics in OpenVG.

FIG. 3 shows a design 300 for using device 100 in FIG. 1 for 2-D graphics in OpenVG. In this design, GPU driver 112 prepares and defines path, transformation matrix, stroke, and paint in stage 1 and performs stroke path generation in stage 2 of 2-D graphics pipeline 200 in FIG. 2. Vertex shader 124 performs transformation between coordinate systems in stage 3. Primitive processor 126 and scan converter 128 perform rasterization in stage 4. Depth test engine 130 performs clipping and masking in stage 5. Fragment shader 132 performs paint generation in stage 6 and image interpolation in stage 7. Pixel blender 134 performs blending and antialiasing in stage 8. The processing for some of the 2-D graphics stages with device 100 is described below.

FIG. 3 shows one design of implementing a specific 2-D graphics pipeline 200 for OpenVG with a device 100 having a specific 3-D GPU 120. Device 100 may also support 2-D graphics in other manners, e.g., with different mappings of the stages in 2-D graphics pipeline 200 to the units in device 100. Device 100 may include extensions and/or modifications to support 2-D graphics operations. 2-D graphics may also be implemented with 3-D GPUs of other designs. For example, a 3-D GPU may include a geometry shader that implements stages 1 and 2 in hardware.

A 2-D drawing or image may be rendered in multiple passes. A first pass may generate values in a buffer for scissoring and masking for the image being rendered. A second pass may perform tessellation for paths in the image and may determine coverage values for these paths. A third pass may apply paint and input images to the paths and generate a final image for a screen. Each pass may utilize some or all of the units within device 100. The processing by various units within device 100 for different stages of the OpenVG 2-D graphics pipeline is described below.

For stage 2, GPU driver 112 may perform tessellation of curved and stroked paths and provide triangle fans. A curved path may be approximated with a triangle fan having a series of edges defined by vertices. These vertices may be determined based on the curvature of the path and image quality requirements.

Figure 4:
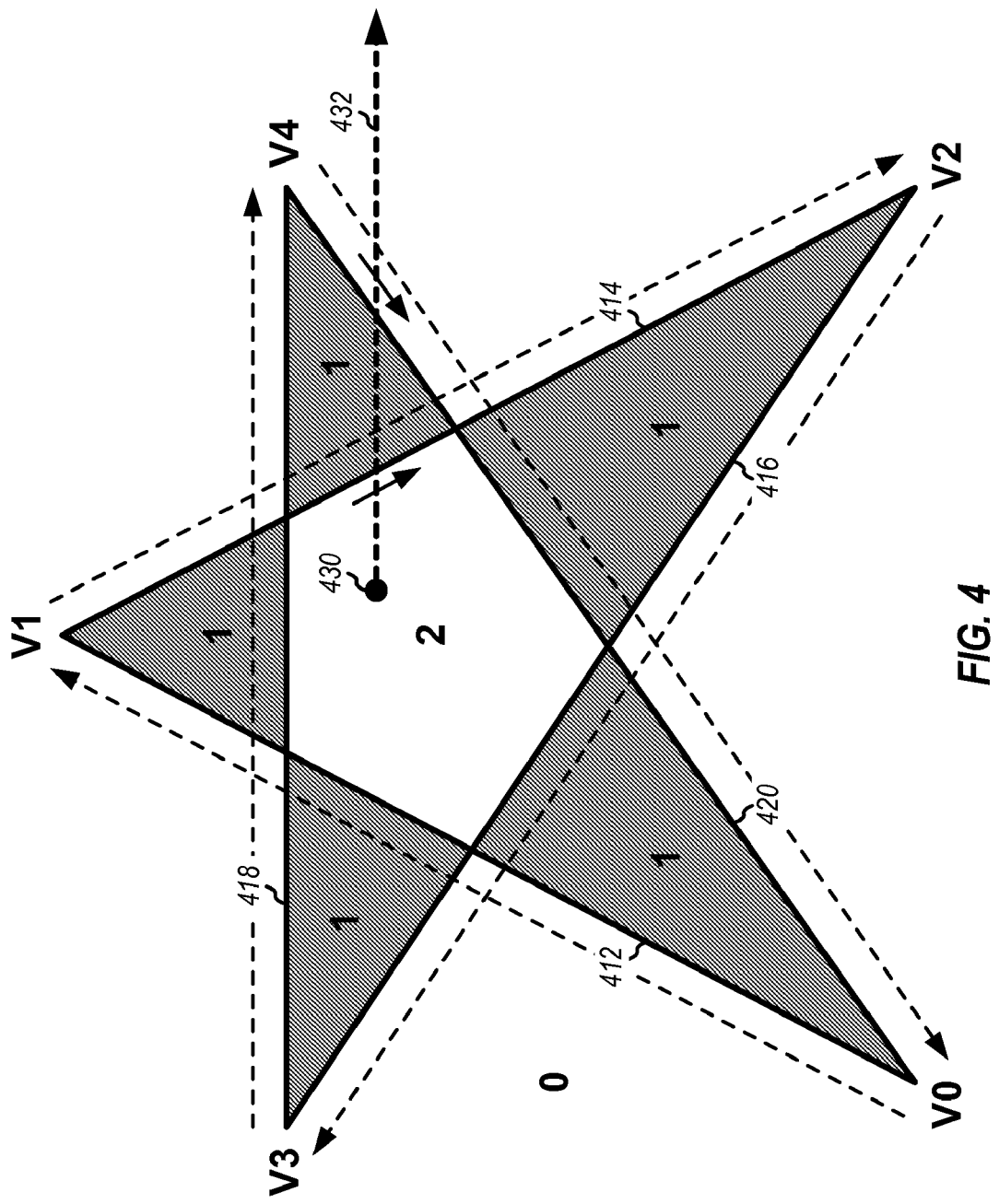
FIG. 4 shows an example of tessellation of a path.

FIG. 4 shows an example of tessellation of a path defined by five vertices V0, V1, V2, V3 and V4. A triangle fan is formed by drawing an edge 412 from V0 to V1, then an edge 414 from V1 to V2, then an edge 416 from V2 to V3, then an edge 418 from V3 to V4, and then an edge 420 from V4 back to V0. V0 is a central point of the triangle fan.

For stage 3, vertex shader 124 may perform transformation of triangle fans, if necessary, from user coordinate system to screen coordinate system. The transformation for 2-D graphics may be performed in similar manner as transformation for 3-D graphics.

For stage 4, units 126, 128 and 130 may generate a coverage mask for the 2-D image based on the triangle fans after transformation, if any. These units determine pixels that are inside and outside of shapes formed by the triangle fans. A path may be closed and its shape may divide a plane into an inside region and an outside region. Pixels within the inside region may be treated differently than pixels within the outside region by subsequent stages.

The inside and outside regions of a shape may be determined based on either a non-zero fill rule or an odd/even fill rule. For both rules, to determine whether a given point is inside or outside of the shape, a line is drawn from that point toward infinity in any direction. In the example shown in FIG. 4, a line 432 is drawn from a point 430 to the right. A counter is reset to zero. Starting from point 430 and walking along line 432 toward infinity, the counter is (a) incremented by one if line 432 is crossed by an edge going from left to right and (b) decremented by one if line 432 is crossed by an edge going from right to left. In FIG. 4, starting from point 430 and walking along line 432, the counter is incremented by one due to edge 414 crossing the line from left to right and is again incremented by one due to edge 420 crossing the line from left to right. Point 430 thus has a fill value of 2. Fill values of 0 and 1 for other regions are indicated in FIG. 4.

For the non-zero fill rule, a point is inside the shape if its fill value is not equal to zero. For the odd/even fill rule, a point is inside the shape if its fill value is odd, regardless of the sign (e.g., −7 is odd and 0 is even). The two fill rules may provide different definitions of the inside and outside regions. In the example shown in FIG. 4, for the non-zero fill rule, the regions with fill values of 1 and 2 are inside the shape and all other regions are outside the shape. For the odd/even fill rule, the regions with fill values of 1 are inside the shape and all other regions are outside the shape.

Units 126, 128 and 130 may determine coverage values for pixels in the image. Depth test engine 130 may be configured for 2-D instead of 3-D processing by disabling back face culling, disabling color, setting the drawing surface, etc. Engine 130 may also be configured to perform stencil test and to disable depth test. Stencil buffer 144 may be cleared in the drawing surface.

Primitive processor 126 may decompose a triangle fan into one or more triangles based on a predetermined rule. For example, the triangle fan in FIG. 4 may be decomposed into three triangles—a first triangle with vertices V0, V1 and V2, a second triangle with vertices V0, V2 and V3, and a third triangle with vertices V0, V3 and V4. Each triangle includes vertex V0, the last vertex of a prior triangle (if any), and a new vertex. Primitive processor 126 may also generate parameters used by scan converter 128 to rasterize each triangle. Scan converter 128 may determine pixels within each triangle.

Depth test engine 130 may update the stencil values for pixels received from scan converter 128. Engine 130 may increment stencil values for pixels within triangles having clockwise orientation and decrement stencil values for pixels within triangles having counter-clockwise orientation, or vice verse. For the example shown in FIG. 4, engine 130 may increment the stencil values for pixels within the first triangle with vertices V0, V1 and V2 having clockwise orientation. Engine 130 may decrement the stencil values for pixels within the second triangle with vertices V0, V2 and V3 having counter-clockwise orientation. Engine 130 may increment the stencil values for pixels within the third triangle with vertices V0, V3 and V4 having clockwise orientation. FIG. 4 gives the stencil values for pixels in different regions after all triangles of the triangle fan are processed.

The stencil value for each pixel may be converted to a coverage value based on the non-zero or odd/even fill rule. For the non-zero rule, a pixel is inside the shape if its stencil value is non-zero and is outside the shape otherwise. For the odd/even rule, a pixel is inside the shape if its stencil value is odd and is outside the shape otherwise.

Pixels may be represented with normal sampling or super sampling antialiasing. Normal sampling refers to the use of one sample for each pixel. A stencil value and a coverage value for each pixel may be determined as described above. Super sampling antialiasing (or simply, antialiasing) refers to the use of multiple samples for each pixel and is a technique to improve image quality. For example, each pixel may be represented with:

2×2 samples for a scale factor of 2 in both x and y directions,

4×2 samples for a scale factor of 4 in the x direction and 2 in the y direction, or 4×4 samples for a scale factor of 4 in both x and y directions.

Other scale factors may also be used for the x and y directions. Different sampling patterns may be used as well, e.g., a pattern sparsely populated with samples and rotated in different directions. With antialiasing, each sample represents a sub-pixel.

With antialiasing, stencil values may be determined for samples (or sub-pixels) instead of pixels. Scan converter 128 may determine the samples within each triangle, and the stencil value for each sample may be updated as described above. After all triangles are processed, a coverage value of '1' or '0' may be determined for each sample based on the stencil value for that sample. A coverage value may then be determined for each pixel by (a) summing the coverage values for all samples of that pixel and (b) normalizing the sum value. For example, an 8-bit coverage value for a pixel may be within a range of 0 to 255, where 0 indicates that the pixel is completely outside the shape and 255 indicates that the pixel is completely inside the shape. An 8-bit coverage value for a pixel may be set equal to the floor of ((Sum/NumSamples)*255+0.5), where Sum is the sum of the coverage values for all samples of that pixel, and NumSamples is the number of samples for the pixel. NumSamples is equal to 4 for 2×2 super sampling, 8 for 4×2 super sampling, 16 for 4×4 super sampling, etc.

For both normal sampling and antialiasing, the coverage values for pixels may be stored in z buffer 142 in FIG. 3 and used to determine color values for the pixels. Antialiasing may also be performed in other manners. For example, coverage values of '1' and '0' may be stored for sub-pixels, color values may be determined for sub-pixels, and the color values for sub-pixels may be combined based on their coverage values to determine final color values for pixels.

For stage 5, depth test engine 130 may perform clipping and masking to clip paths and final image to the bounds of the drawing surface and/or the interior of one or more scissoring regions. Each scissoring region describes a specific section of the drawing surface to retain. Engine 130 may perform scissoring by determining whether each pixel on the drawing surface falls within any one of the scissoring regions. Each pixel may be associated with a scissor value that may indicate whether that pixel is within any scissoring region.

Stencil buffer 144 may be used to store scissor values for pixels and may be cleared (e.g., to all zeros) prior to performing scissoring. Scissoring may then be performed for one scissoring region at a time. For each scissoring region, scan converter 128 may determine the pixels within the scissoring region. Engine 130 may update the scissor value for each pixel from scan converter 128. For example, engine 130 may increment the scissor value for each pixel by one if the scissoring region is being added and may decrement the scissor value by one if the scissoring region is being removed. A scissoring mask is obtained after all scissoring regions have been drawn. The scissor value for a pixel is zero if the pixel is not within any scissoring region and is non-zero if the pixel is within at least one scissoring region. Scissoring may be performed before or after drawing paths.

The scissor values in stencil buffer 144 and the coverage values in z buffer 142 may be used to determine whether or not to render pixels. A bounding box may be drawn for a path and rasterized to determine the pixels within the box. Each pixel in the box may be (a) discarded or dropped if its coverage value is zero or its scissor value is zero or (b) passed to the next stage otherwise. The coverage values for the passed pixels may also be provided to the next stage and used to determine color values for these pixels.

Masking may also be performed based on the coverage values and mask values from a mask buffer. A coverage value for a pixel may be multiplied with a mask value for the pixel. The pixel may be dropped if the resultant value is zero and passed otherwise. Masking may also be performed by fragment shader 132 or some other unit instead of depth test engine 130.

For stage 6, fragment shader 132 may determine color and alpha values for each pixel in the final image based on paint or an input image. Fragment shader 132 may fill the interior of a path with one type of paint and/or stroke the outline of the path with the same or different type of paint. Paint defines a color value and an alpha value for each pixel being drawn. There are three types of paint—color paint, gradient paint, and pattern paint. Color paint defines a constant color for all pixels. Gradient paint defines a linear or radial pattern of smoothly varying colors. Pattern paint defines a possibly repeating rectangular pattern of colors based on a source image. Paint is defined in a paint coordinate system and may be transformed to user coordinate system. After transformation, a paint value nearest a given (x,y) pixel may be used for that pixel, or paint values from multiple pixels surrounding a central pixel may be combined to produce an interpolated paint value. Fragment shader 132 may fill and/or stroke a path with paint in an analogous manner as applying texture to a 3-D image. Fragment shader 132 may also filter pattern paint with a kernel. The paint and color information may be defined by GPU driver 112 and sent to the appropriate processing units.

Color information may be stored or processed in several color formats. Human eyes are more sensitive to low luminance/intensity than high luminance. A color value may be compressed via a process commonly referred to as gamma compression to obtain a non-linear color value. Gamma compression maps the color value such that finer resolution is achieved for low luminance and coarser resolution is achieved for high luminance. Gamma compression may be performed, e.g., as $c_{nl} = c_{lin}^{\gamma}$ where $c_{lin}$ is a linear color value, $c_{nl}$ is a non-linear color value, and $\gamma$ is a gamma value that determines the amount of compression. Gamma expansion is a complementary process that expands a non-linear color value to obtain a linear color value. Gamma expansion is based on a function that is an inverse of the function used for gamma compression.

Fragment shader 132 may perform color conversion for stages 6 and 7. Color values for pixels may be represented in any one of the following formats:

sRGBA—non-premultiplied non-linear color format,
sRGBA_PRE—premultiplied non-linear color format,
lRGBA—non-premultiplied linear color format, and
lRGBA_PRE—premultiplied linear color format, where R, G, B and A denote red, green, blue and alpha, respectively.

Paint and images may be stored in memory as non-linear color values and may be processed as linear color values. Color format conversion may be performed to convert non-linear color values to linear color values, and vice versa, as necessary. A color value c may be multiplied with an alpha value $\alpha$ to obtain a pre-multiplied color value $c'=\alpha * c$. Certain operations (e.g., blending) may be more conveniently performed on pre-multiplied color values.

The conversion between various color formats may be achieved with a reciprocal (RCP) look-up table (LUT), a gamma LUT, and a degamma LUT. The RCP LUT receives an input value and provides a reciprocal of the input value. The gamma LUT stores a gamma compression function, receives a linear color value, and provides a non-linear color value. The degamma LUT stores a complementary gamma expansion function, receives a non-linear color value, and provides a linear color value.

The conversion from pre-multiplied format to non pre-multiplied format may be achieved as follows:

--- oneOverAlpha = RCP_LUT (alpha)
RGB = RGB*oneOverAlpha

--- where RGB denotes operation for each of red, green, and blue color values.

The conversion between linear and non-linear color formats may be achieved as follows:
RGB=DeGamma_LUT (RGB)//non-linear to linear format conversion
RGB=Gamma_LUT (RGB)//linear to non-linear format conversion
RGBA=LUT (RGBA)//general format conversion
General format conversion may be used to transform one color space to another color space, where the transformation may be based on any function.

For stage 7, fragment shader 132 may perform convolution filtering on input images. Convolution filtering may be used to obtain effects such as edge sharpening, blurring, noise reduction, scaling, rotation, texture mapping, etc.

Figure 5:
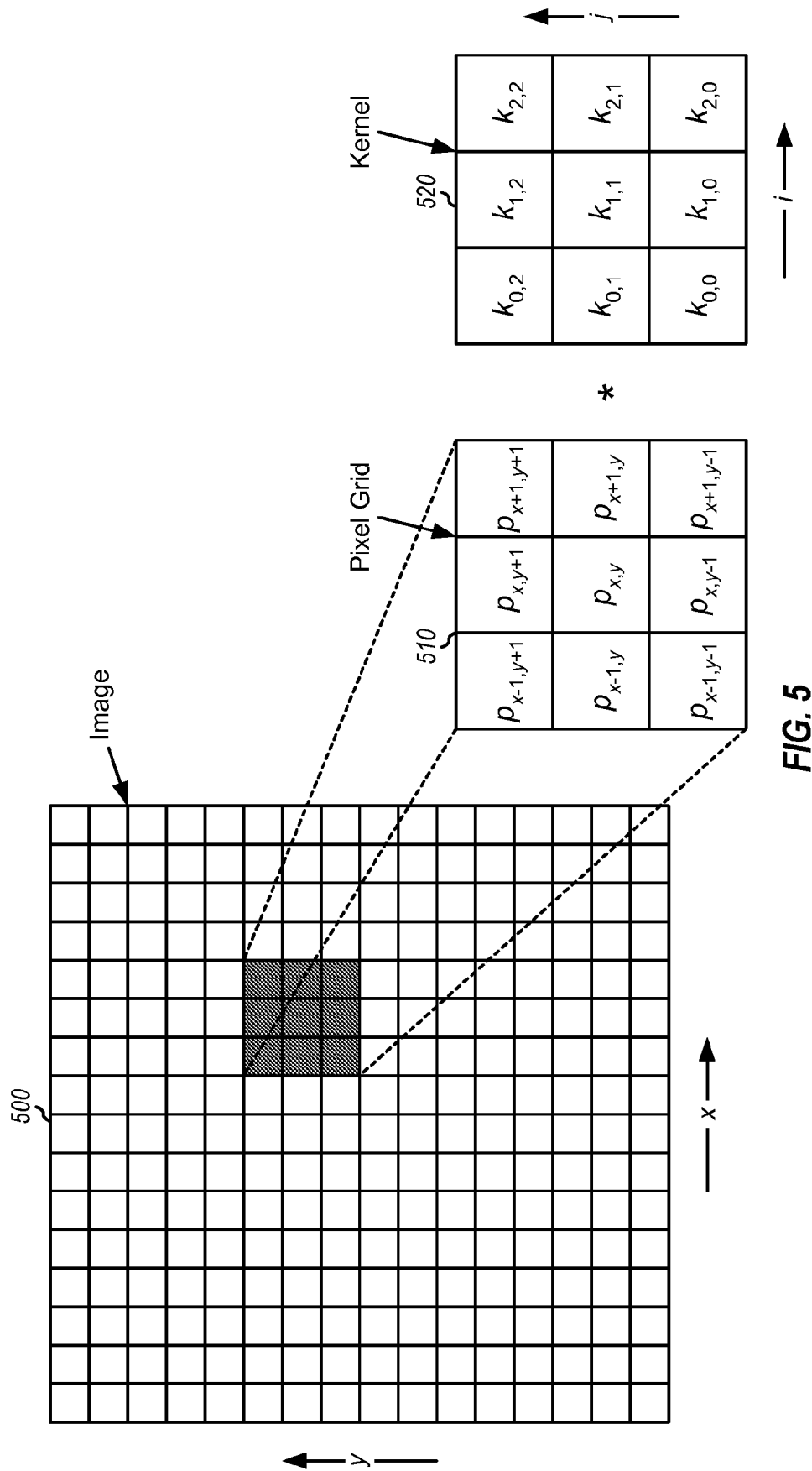
FIG. 5 shows an example of convolution filtering of a 3×3 grid.

FIG. 5 shows an example of convolution filtering of a 3×3 grid 510 within an image 500. Nine pixel values $p_{x-1,y-1}$ through $p_{x+1,y+1}$ within grid 510 are filtered with nine coefficients $k_{0,0}$ through $k_{2,2}$ in a 3×3 kernel 520 to generate a new pixel value at position (x, y).

Convolution filtering may be expressed as:

$$p'_{x,y} = S \cdot \left( \sum_{i=0}^{W-1} \sum_{j=0}^{H-1} k_{i,j} \cdot p_{x+i-shiftX, y+i-shiftY} \right) + b, \quad \text{Eq (1)}$$

where
W is the width of the grid/kernel and H is the height of the grid,
$k_{i,j}$ is a kernel coefficient at position (i,j) in the grid,
S is a scaling factor and b is a bias value,
$p_{x,y}$ is an original pixel value at position (x, y) in the image,
$p'_{x,y}$ is a new pixel value that replaces the original pixel value at position (x, y),
shiftX is an offset from position (x, y) to the left of the grid, and
shiftY is an offset from position (x, y) to the bottom of the grid.

S may be a normalization factor of $$S = \left( \sum_{i=0}^{W-1} \sum_{j=0}^{H-1} k_{i,j} \right)^{-1}$$

or some other value.

If the kernel coefficients are separable in the x and y direction, then convolution filtering may be expressed as:

$$p'_{x,y} = S \cdot \left( \sum_{i=0}^{W-1} \sum_{j=0}^{H-1} k_i \cdot k_j \cdot p_{x+i-shiftX, y+i-shiftY} \right) + b, \quad \text{Eq (2)}$$

where
$k_i$ is a kernel coefficient at horizontal position i in the grid, and
$k_j$ is a kernel coefficient at vertical position j in the grid.
The kernel coefficient at position (i, j) may be derived as: $k_{i,j}=k_i \cdot k_j$.

In the example shown in FIG. 5, W=3, H=3, shiftX=1, and shiftY=1. In general, shiftX is approximately half of the width, and shiftY is approximately half of the height. Different types of convolution filtering and different kernels may produce different effects in the filtered image.

Convolution filtering of an arbitrary H×W pixel grid may be achieved by partitioning the grid into smaller sections, performing computation for each section, and combining the intermediate results for all sections to obtain a final result. The size of the section may be selected based on the processing capabilities of an arithmetic logic unit (ALU) used for computation. In general, any section size may be used. In one design, the section size is 2×2 or smaller. In this design, a 3×3 pixel grid may be decomposed into one 2×2 section, one 1×2 section, one 2×1 section, and one 1×1 section.

The convolution computation for a 2×2 section may be expressed as:

$$r_{i,j} = k_{i,j} \cdot p_{x_i, y_j} + k_{i+1,j} \cdot p_{x_{i+1}, y_j} + k_{i,j+1} \cdot p_{x_i, y_{j+1}} + k_{i+1,j+1} \cdot p_{x_{i+1}, y_{j+1}}, \quad \text{Eq (3)}$$

where $(x_i, y_j)$ denotes the position of the lower left pixel in the 2×2 section, and
$r_{i,j}$ is an intermediate result for the 2×2 section.

The computation in equation (3) may be efficiently performed by an ALU with four units, e.g., a quad ALU that can compute an inner product of two 4×1 vectors or four scalar ALUs that can multiply and accumulate four pairs of scalars. The convolution computation for a 1×1, 1×2 or 2×1 section includes a subset of the coefficients and a subset of the pixels shown in equation (3).

The coordinate system for the pixels may or may not match the coordinate system for the kernel coefficients. Furthermore, the x and y values for a given pixel may be integer or non-integer values. For example, convolution filtering may be performed on texture pixels (texels) given in (u, v) coordinate system that may not match the (x, y) coordinate system of the image. If the coordinates for a pixel are real values, then the coefficient to apply to the pixel may be determined in several manners. For a snap-to-nearest mode, the coordinates for the pixel are rounded to the nearest integer values, and the kernel coefficient at the rounded coordinates is applied to the pixel. For an interpolated mode, four kernel coefficients closest to the pixel are used to generate an interpolated coefficient, which is then applied to the pixel.

Two modes of convolution filtering may be supported—mode 0 and mode 1. For mode 0, convolution computation may be performed on sections of up to four pixels using snap-to-nearest coefficients. The four pixel coordinates may be rounded to the nearest integer values. Up to four pixel values at the rounded coordinates may be retrieved from memory and applied with up to four kernel coefficients to obtain a new pixel value. For mode 1, convolution computation may be performed on each pixel using an interpolated coefficient generated from four kernel coefficients that are closest to the pixel coordinates.

Figure 6:
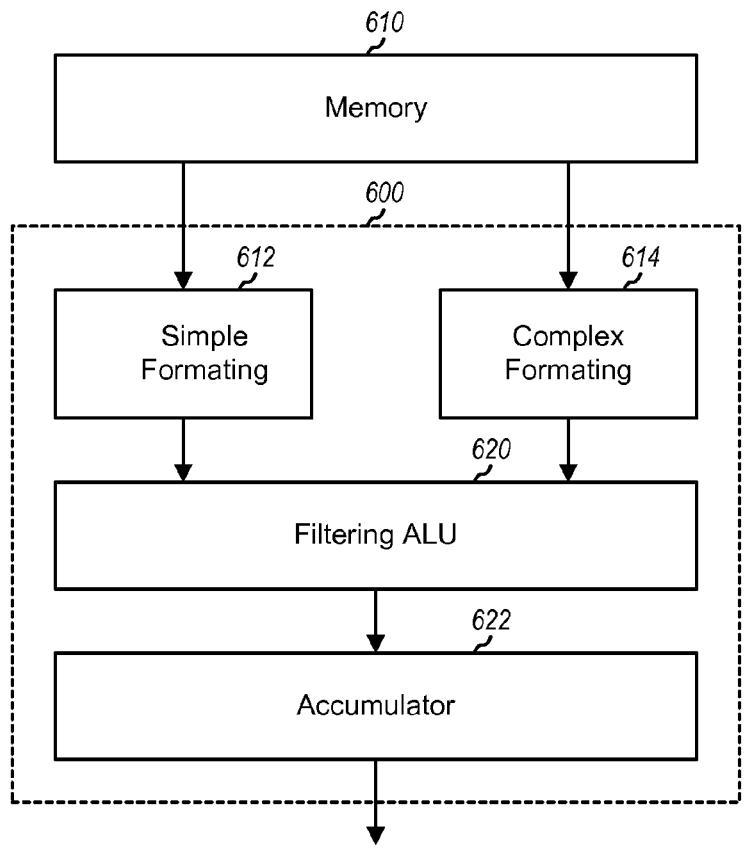
FIG. 6 shows a block diagram of a filtering unit.

FIG. 6 shows a block diagram of a design of a filtering unit 600, which may be part of fragment shader 132. A buffer/memory 610 provides color and alpha values in one of the color formats given above. A unit 612 performs conversions for simple formatting used on the received color and alpha values. A unit 614 performs decompression for complex formatting. A filtering ALU 620 multiplies color values for pixels with kernel coefficients (e.g., for 2×2 or smaller sections) and provides intermediate results. An accumulator 622 accumulates the intermediate results for each grid and provides final results for a pixel covered by the grid.

Fragment shader 132 may also perform interpolation between input image and background color in order to determine color and alpha values for each pixel. Fragment shader 132 may provide interpolation results to pixel blender 134 for blending with other color and alpha values.

For stage 8, pixel blender 134 may perform blending in accordance with one of a number of blending modes supported by OpenVG. A blending mode is associated with the following:

1. an alpha blending equation denoted as $\alpha(\alpha_{src}, \alpha_{dst})$ and
2. a color blending equation denoted as c ($c_{src}, c_{dst}, \alpha_{src}, \alpha_{dst}$), where $\alpha_{src}$ is a source alpha value, $\alpha_{dst}$ is a destination alpha value, $c_{src}$ is a source color value, and $c_{dst}$ is a destination color value. A color value c may be for red (R), green (G), or blue (B).

Blending combines a source color and alpha tuple denoted as ($R_{src}, G_{src}, B_{src}, \alpha_{src}$) with a destination color and alpha tuple denoted as ($R_{dst}, G_{dst}, B_{dst}, \alpha_{dst}$) and provides a blended tuple composed of c ($R_{src}, R_{dst}, \alpha_{src}, \alpha_{dst}$), c($G_{src}, G_{dst}, \alpha_{src}, \alpha_{dst}$), c($B_{src}, B_{dst}, \alpha_{src}, \alpha_{dst}$) and $\alpha(\alpha_{src}, \alpha_{dst})$. The combining is performed in accordance with the alpha and color blending equations. In particular, the source and destination color values for each color component is combined in accordance with the color blending equation, and the source and destination alpha values are combined in accordance with the alpha blending equation. Different results may be obtained with different equations and/or different alpha values. The blended tuple typically replaces the destination tuple.

OpenVG supports five Porter-Duff blending modes that use the following alpha and color blending equations:

$$\alpha(\alpha_{src}, \alpha_{dst}) = \alpha_{src} * F_{src} + \alpha_{dst} * F_{dst}, \text{ and} \qquad \text{Eq (4)}$$

$$c(c_{src}, c_{dst}, \alpha_{src}, \alpha_{dst}) = \frac{\alpha_{src} * c_{src} * F_{src} + \alpha_{dst} * c_{dst} * F_{dst}}{\alpha(\alpha_{src}, \alpha_{dst})}, \qquad \text{Eq (5)}$$

where $F_{src}$ and $F_{dst}$ are source and destination blending factors, respectively. $F_{src}$ and $F_{dst}$ for the five Porter-Duff blending modes are given in OpenVG.

A color blending equation for pre-multiplied color values may be given as:

$$c'(c'_{src}, c'_{dst}, \alpha_{src}, \alpha_{dst}) = c'_{src} * F_{src} + c'_{dst} * F_{dst} \qquad \text{Eq (6)}$$

Equation (6) is equivalent to equation (4). Equation (6) may be used for pre-multiplied color values $c'_{src}$ and $c'_{dst}$ whereas equation (4) may be used for non pre-multiplied color values $c_{src}$ and $c_{dst}$.

OpenVG supports four additional blending modes. Table 1 lists the four additional blending modes and gives the color blending equation for each mode. Each additional blending mode combines color values and provides a blended pre-multiplied color value denoted as $c'(c_{src}, c_{dst}, \alpha_{src}, \alpha_{dst})$.

TABLE 1

| Blending Mode | Color Blending Equation c' ($c_{src}, c_{dst}, \alpha_{src}, \alpha_{dst}$) |
|---|---|
| VG_BLEND_MULTIPLY | $\alpha_{src} * c_{src} * (1 - \alpha_{dst}) + \alpha_{dst} * c_{dst} * (1 - \alpha_{src}) + \alpha_{src} * c_{src} * \alpha_{dst} * c_{dst}$ |
| VG_BLEND_SCREEN | $\alpha_{src} * c_{src} + \alpha_{dst} * c_{dst} - \alpha_{src} * c_{src} * \alpha_{dst} * c_{dst}$ |
| VG_BLEND_DARK | min {($\alpha_{src} * c_{src} + \alpha_{dst} * c_{dst} * (1 - \alpha_{src})$), ($\alpha_{dst} * c_{dst} + \alpha_{src} * c_{src} * (1 - \alpha_{dst})$)} |
| VG_BLEND_LIGHTEN | max {($\alpha_{src} * c_{src} + \alpha_{dst} * c_{dst} * (1 - \alpha_{src})$), ($\alpha_{dst} * c_{dst} + \alpha_{src} * c_{src} * (1 - \alpha_{dst})$)} |

OpenVG further supports an additive blending mode that may be used when the source and destination do not overlap. The alpha and color blending equations for the additive blending mode are given as:

$$\alpha(\alpha_{src}, \alpha_{dst}) = \min\{(\alpha_{src} + \alpha_{dst}), 1\}, \text{ and} \qquad \text{Eq (7)}$$

$$c(c_{src}, c_{dst}, \alpha_{src}, \alpha_{dst}) = \frac{\alpha_{src} * c_{src} + \alpha_{dst} * c_{dst}}{\min\{(\alpha_{src} + \alpha_{dst}), 1\}}. \qquad \text{Eq (8)}$$

Other blending modes may also be supported for 2-D graphics. In general, GPU 120 may support any set of blending modes for any set of blending equations for 2-D graphics. GPU 120 may also support stencil interpolation, which uses the following set of equations:

$$\alpha_{tmp} = \alpha(\alpha_{image} * \alpha_{paint}, \alpha_{dst}), \qquad \text{Eq (9)}$$

$$c_{dst} \leftarrow c(c_{paint} c_{dst}, c_{image} * \alpha_{image} * \alpha_{paint}, \alpha_{dst})/\alpha_{tmp}, \qquad \text{Eq (10)}$$

$$\alpha_{dst} \leftarrow \alpha_{tmp}, \qquad \text{Eq (11)}$$

where $\alpha_{image}$ is a first source alpha value, $\alpha_{paint}$ is a second source alpha value, $\alpha_{src} = \alpha_{image} * \alpha_{paint}$ for equation (9), and $\alpha_{src} = \alpha_{image} * \alpha_{paint} * c_{image}$ for equation (10).

Alpha blending equation (9) and color blending equation (10) may be dependent on blending mode. For example, if a "Src over Dst" Porter-Duff blending mode is selected, then the stencil interpolation may be expressed as:

$$\alpha_{tmp} = \alpha_{image} * \alpha_{paint} + \alpha_{dst} * (1 - \alpha_{image} * \alpha_{paint}),$$

$$c_{dst} \leftarrow (\alpha_{image} * \alpha_{paint} * c_{image} c_{paint} + \alpha_{dst} * c_{dst} * (1 - \alpha_{image} * \alpha_{paint} * c_{image})) / \alpha_{tmp},$$

$$\alpha_{dst} \leftarrow \alpha_{tmp}.$$

Blending equations for various blending modes (e.g., the blending modes in OpenVG and/or other blending modes) may be efficiently implemented with a base set of operations. Each blending equation may be decomposed into a sequence of operations, with each operation taken from the base set. Different blending equations may be implemented with different sequences of operations. The base set of operations may simplify hardware implementation and may provide flexibility to support various blending equations as well as other graphics functions and features.

Figure 7:
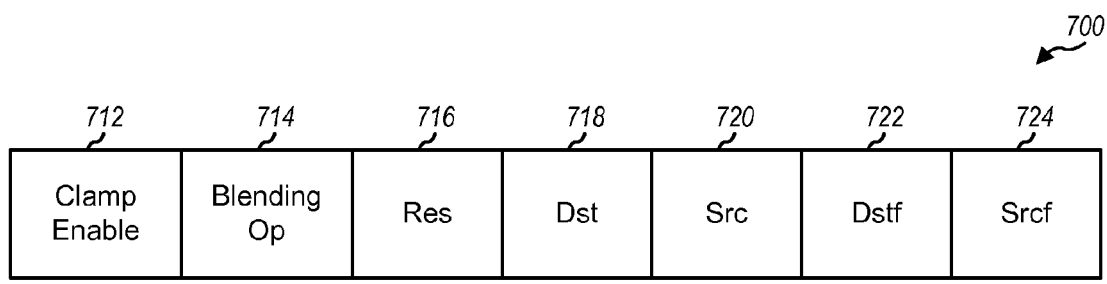
FIG. 7 shows a design of a blending instruction.

FIG. 7 shows a design of a blending instruction 700 for blending. A blending operation (Op) field 714 indicates which operation in the base set to perform. A source (Src) field 720 indicates where a source value is stored. A destination (Dst) field 718 indicates where a destination value is stored. A Srcf field 724 indicates a source blending factor for the operation. A Dstf field 722 indicates a destination blending factor for the operation. A result (Res) field 716 indicates where to store the result(s) of the operation. A clamp enable field 712 indicates whether to constrain the result(s) to a predetermined range of values, e.g., between 0 and 1. Other instruction formats with different fields may also be used.

Table 2 shows an example of the base set of operations and an Op code for each operation. Operations with Op codes 0 through 7 are referred to as operations 0 through 7, respectively.

TABLE 2

| Op Code | Operation |
|---|---|
| 0 | Res = Src * Srcf + Dst * Dstf |
| 1 | Res = Src * Srcf − Dst * Dstf |
| 2 | Res = Min {Src, Dst} |
| 3 | Res = Max {Src, Dst} |
| 4 | Src = Src * Srcf, Dst = Dst * Dstf |
| 5 | Res = RCP {Src} |
| 6 | Res = DegammaLUT {Src} |
| 7 | Res = GammaLUT {Src} |

For operations 0 and 1, the source and destination values are scaled by the source and destination blending factors, respectively, and the scaled values are combined. Operation 2 provides the smaller of the source and destination values whereas operation 3 provides the larger of the two values. Operation 4 scales the source and destination values with the source and destination blending factors, respectively, and stores the two scaled values. Operation 5 performs a reciprocal operation on a source value and provides a result value. Operations 6 and 7 are used for gamma expansion and gamma compression, respectively. Table 2 shows a specific design for the base set of operations. Other sets of operations may also be used for blending.

Source color values may be received from fragment shader 132 and stored in a source register. Destination color values may be retrieved from memory (e.g., color buffer 148) and stored in a destination register. The source and destination color values may be combined, and the blended color values may be stored in the destination register. To flexibly support different operations, multiple source registers may be used to store source color and alpha values as well as intermediate values. Multiple destination registers may also be used to store destination color and alpha values as well as intermediate values.

Src field 720 and Dst field 718 may each indicate any register in a set of available registers. This set may include a source register, a second source register, a destination register, a temporary destination register, etc. Res field 716 may indicate any one of multiple output options such as, e.g., the source register, second source register, destination register, temporary destination register, both source and destination registers, final output, etc.

The Srcf and Dstf blending factors are used to scale the Src and Dst values, respectively, for operations 0, 1 and 4 in Table 2. The Srcf and Dstf blending factors may each be selected from a set of blending factors that can support all blending modes. This set may include (a) zero, (b) alpha and color values in the source register, second source register, destination register, a constant register, etc., (c) one minus these alpha and color values, (d) one over these alpha and color values, (e) the smaller of source alpha and one minus source alpha, and/or (f) other values.

Each blending mode may be implemented with a set of blending instructions. For example, each of the five Porter-Duff blending modes shown in equations (4) through (6) may be implemented with two instructions. The first instruction may multiply the source and destination color values with the source and destination alpha values, respectively. The second instruction may multiply the pre-multiplied source and destination color values with Fsrc and Fdst blending factors, respectively, and combine the two scaled values, as shown in equation (6). The two instructions may be given as:

Src=Src*Srcf, Dst=Dst*Dstf
Res=Src*Srcf+Dst*Dstf where the source blending factor Srcf and the destination blending factor Dstf are dependent on the Porter-Duff blending mode being implemented.

Pixel blender 134 may also perform color conversion between different color formats. Color conversion may be performed for color values read from memory and/or color values written to memory.

Various blending modes may be supported as follows:

```
10  Call RCP to compute 1/a.dst        //Dst pre-format
20  Call MUL to divide a.dst out of Dst
30  Call DeGammaLUT to convert non-linear color to linear color
40  Op0: Src=a.src*Src, Dst=a.dst*Dst  //do blending
41  Op1: Instruction for mode-dependent blending equation
   .
   .
   .
4n  Opn: Instruction for mode-dependent blending equation
50  Call RCP to compute 1/a.res        //Dst post-format
60  Call MUL to divide a.res out of Dst
70  Call GammaLUT to convert linear color to non-linear color
80  Call MUL to multiply a.res with Dst and store Dst
```

The pseudo-code above assumes that color components are stored as pre-multiplied non-linear color values. Instructions 10, 20 and 30 are for pre-formatting of the destination color value. Instructions 10 and 20 divide out the destination alpha (a.dst) from the destination color value. Instruction 30 converts non-linear color to linear color. Instructions 40 to 4n are for operations that are dependent on the selected blending mode and may include multiplication of the source and destination color values with the source alpha (a.src) and destination alpha, respectively. Instructions 50 to 80 are for post-formatting of the result color value. Instructions 50 and 60 divide out the result alpha (a.res) to obtain a non pre-multiplied color value. Instruction 70 converts linear color to non-linear color. Instruction 80 multiplies the non-linear color value with the result alpha and stores the final result back to memory. Instructions 10, 20 and 80 may be omitted if the color values are stored in non pre-multiplied format. Instructions 30 and 70 may be omitted if color components are stored as linear color values instead of non-linear color values.

Figure 8:
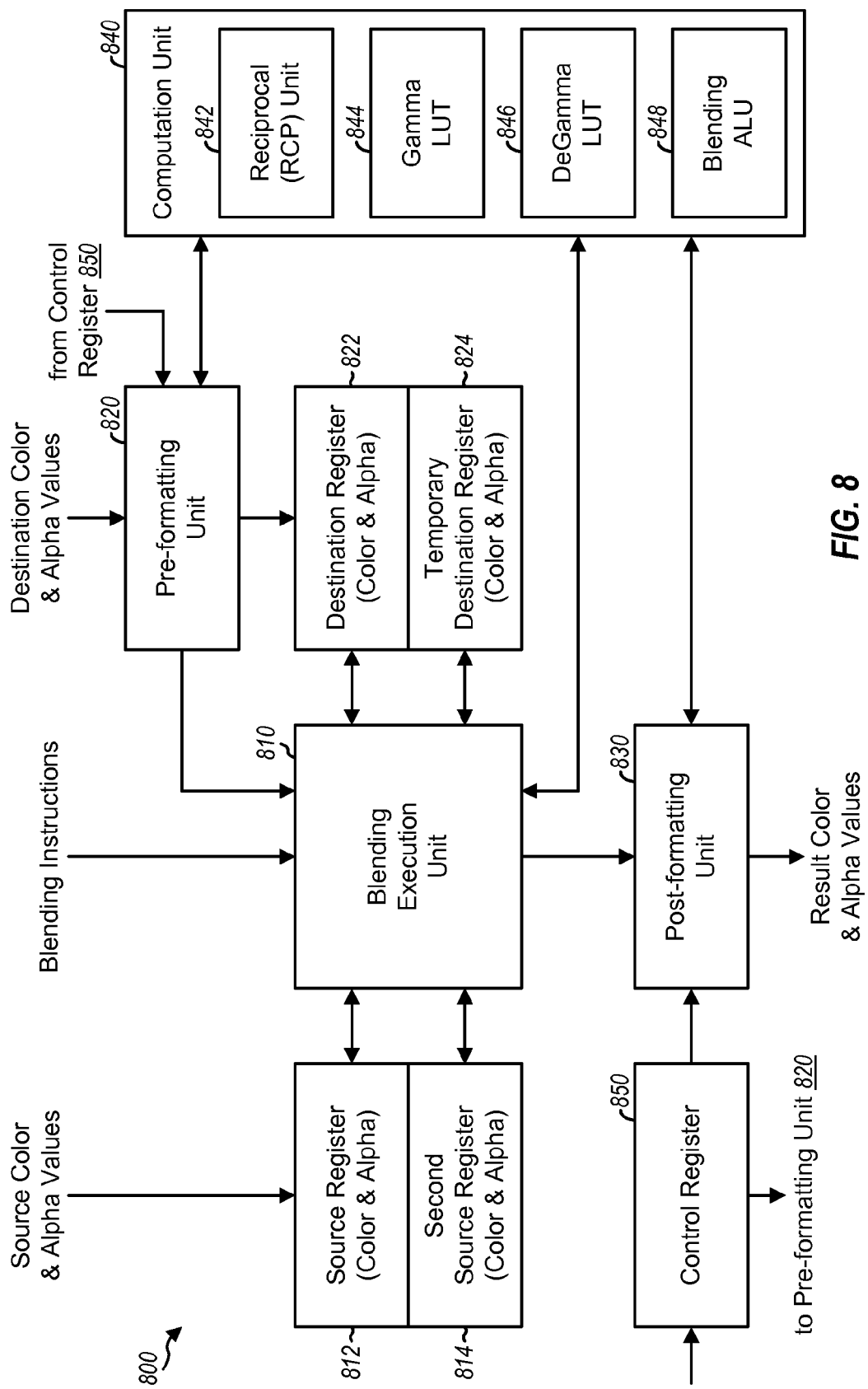
FIG. 8 shows a block diagram of a blending unit.

FIG. 8 shows a block diagram of a design of a blending unit 800, which may be part of pixel blender 134 in FIG. 3. Source registers 812 and 814 store source color and alpha values from fragment shader 132 and/or intermediate results from a blending execution unit 810. A pre-formatting unit 820 receives destination color and alpha values (e.g., from color buffer 148 in FIG. 3) and performs pre-formatting. Unit 820 may divide out alpha for pre-multiplied color values, perform conversion from non-linear color to linear color, etc. Destination registers 822 and 824 store pre-formatted destination color and alpha values from pre-formatting unit 820 and/or intermediate results from blending execution unit 810.

Blending execution unit 810 receives blending instructions (e.g., from command engine 122 in FIG. 3) and decodes the received instructions. Unit 810 also reads source and destination values and blending factors according to the decoded instructions and sends these values and factors to a computation unit 840 for processing. Unit 810 receives results from unit 840 and stores these results in the appropriate registers. A post-formatting unit 830 performs post-formatting on the results and may divide out alpha for pre-multiplied color values, perform conversion from linear color to non-linear color, multiply by alpha if the result color values are to be stored in pre-multiplied format, etc.

Unit 840 includes a reciprocal (RCP) unit 842, a gamma LUT 844, a degamma LUT 846, and a blending ALU 848. Blender ALU 848 may operate on operands received from unit 810, 820 and 830 and provide the results back to these units. Unit 842 receives input operands and provides the reciprocal of the operands. Gamma LUT 844 receives linear color values and provides non-linear color values. Degamma LUT 846 receives non-linear color values and provides linear color values. Unit 840 may be part of blending unit 800 and used just for pixel blender 134. Alternatively, unit 840 may be external to pixel blender 134 and shared by pixel blender 134 and fragment shader 132 for color conversion.

A control register 850 stores control bits that indicate the color format of the data being processed. For example, the control bits may indicate whether color values are stored in (a) pre-multiplied or non pre-multiplied format and (b) non-linear or linear format. Unit 820 may perform pre-formatting on inbound destination color values in accordance with the control bits. Similarly, unit 830 may perform post-formatting on outbound color values in accordance with the control bits. Control register 850 may be set by GPU driver 112 or some other unit.

Figure 9:
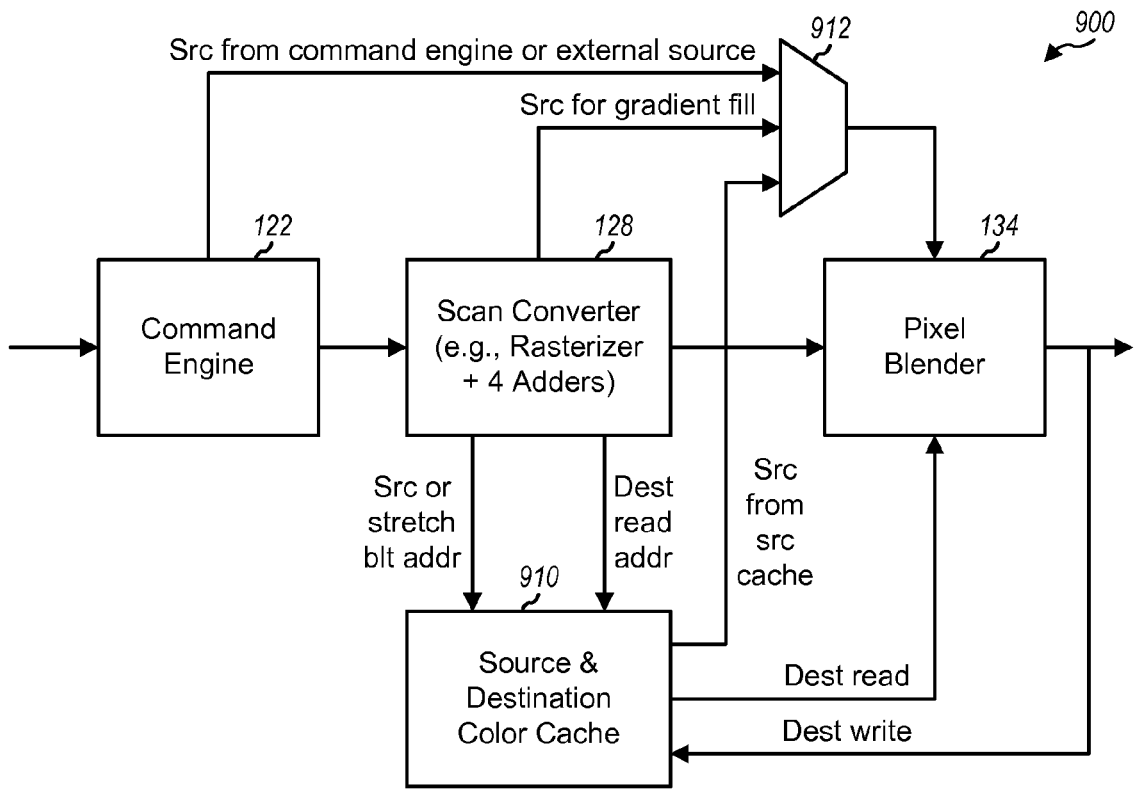
FIG. 9 shows use of the device in FIG. 1 to support basic 2-D graphics.

FIG. 9 shows a design 900 for using device 100 in FIG. 1 for basic 2-D graphics. In this design, command engine 122, scan converter 128, and pixel blender 134 are mainly used for 2-D graphics processing, and all other units are bypassed or used sparingly.

Primitives for basic 2-D graphics may include lines, rectangle, and triangle fans. Other primitives may be tessellated into rectangles, triangles, or lines, e.g., by GPU driver 112. Attributes for basic 2-D graphics may include, for each pixel, one color value and one pair of coordinates for a source buffer for a bit block transfer (bitblt), a stretch bitblt, or a stipple pattern.

For a stippled line, GPU driver 112 may treat a line stipple pattern as 1-D texture and compute its coordinates for two end points of the line and may then provide coordinate information to scan converter 128 via command engine 122. Scan converter 128 may compute the coordinates of every pixel on the line and generate pixel addresses. The coordinates may be used to look up the stipple pattern in a control register without using fragment shader 132. A mask may be obtained from the stipple pattern. The rasterization direction may be changed for overlapping bitblt. To avoid use of fragment shader 132 and attribute setup and interpolation for power saving, GPU driver 112 may perform attribute setup and compute gradients, e.g., for up to four components. Scan converter 128 may include four adders to perform interpolation for up to four components. For bitblt and stretched bitblt, GPU driver 112 may provide initial coordinates and gradients for a source image/buffer. Scan converter 128 may then compute coordinates for every pixel inside a primitive, e.g., a line, a triangle, or a rectangle primitive. The coordinates may be used to look up pixel values in the source image/buffer via a color cache. For gradient fill, GPU driver 112 may provide initial color and gradients (e.g., for up to 4 components). Scan converter 128 may use the same adders (used to compute pixel coordinates) to compute color values for every pixel inside a rectangle primitive.

Pixel information and color information may be provided directly to pixel blender 134. A multiplexer 912 may receive source color (Src) from an external source via command engine 122, source color for gradient fill from scan converter 128, or source color from a color cache/buffer 910. Multiplexer 912 may provide the source color from one of its three inputs to pixel blender 134. Color cache 910 may be located between pixel blender 134 and color buffer 148 in FIG. 3. Color cache 910 may receive a source address or stretched bitblt address from scan converter 128 and may provide a source color to multiplexer 912. Color cache 910 may also receive a destination read address from scan converter 128 and provide a destination color to pixel blender 134. Pixel blender 134 may support various 2-D graphics functions such as bit block transfer, 2-D alpha blending, font rendering, ROP3, source and destination color key, palette table (e.g., 256×32 or 16×16×32), etc. ROP3 is a raster operation of three operands (e.g., source color, destination color, and pattern/brush color). Other 2-D graphics functions such as convolution filtering may be performed by fragment shader 132 or some other unit.

Figure 10:
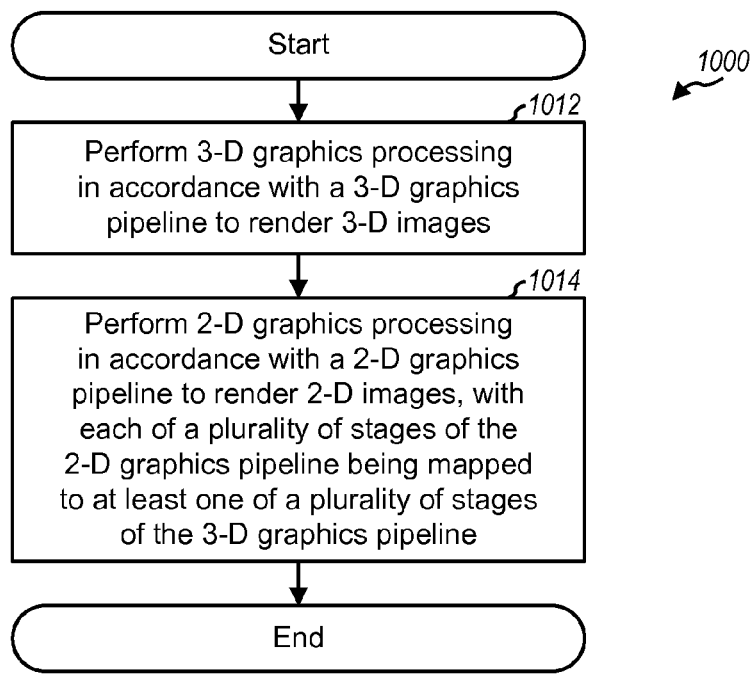
FIG. 10 shows a process to support 2-D and 3-D graphics.

FIG. 10 shows a process 1000 for supporting 2-D and 3-D graphics. 3-D graphics processing is performed in accordance with a 3-D graphics pipeline to render 3-D images (block 1012). 2-D graphics processing is performed in accordance with a 2-D graphics pipeline to render 2-D images (block 1014). Each of a plurality of stages of the 2-D graphics pipeline is mapped to at least one of a plurality of stages of the 3-D graphics pipeline, e.g., as shown in FIG. 3.

In general, the 2-D graphics pipeline and 3-D graphics pipeline may each include any number of stages. The 2-D graphics pipeline stages may be mapped to the 3-D graphics pipeline stages based on various mapping schemes. For example, a clipping, masking and scissoring stage in 2-D graphics may be mapped to a depth test stage in 3-D graphics. Coverage values for pixels within paths in 2-D graphics may be determined using a rasterization stage, the depth test stage, etc., in 3-D graphics. A paint generation stage and an image interpolation stage in 2-D graphics may be mapped to a fragment shader stage in 3-D graphics. A blending stage in 2-D graphics may be mapped to a blending stage in 3-D graphics, and both blending stages may be supported with a plurality of blending modes. Each blending mode may be associated with a respective sequence of instructions. Other stages in 2-D graphics may be mapped to other stages in 3-D graphics, e.g., as described above.

The GPU described herein may be used for wireless communication devices, handheld devices, gaming devices, computing devices, computers, consumer electronics devices, etc. An exemplary use of the GPU for a wireless communication device is described below.

Figure 11:
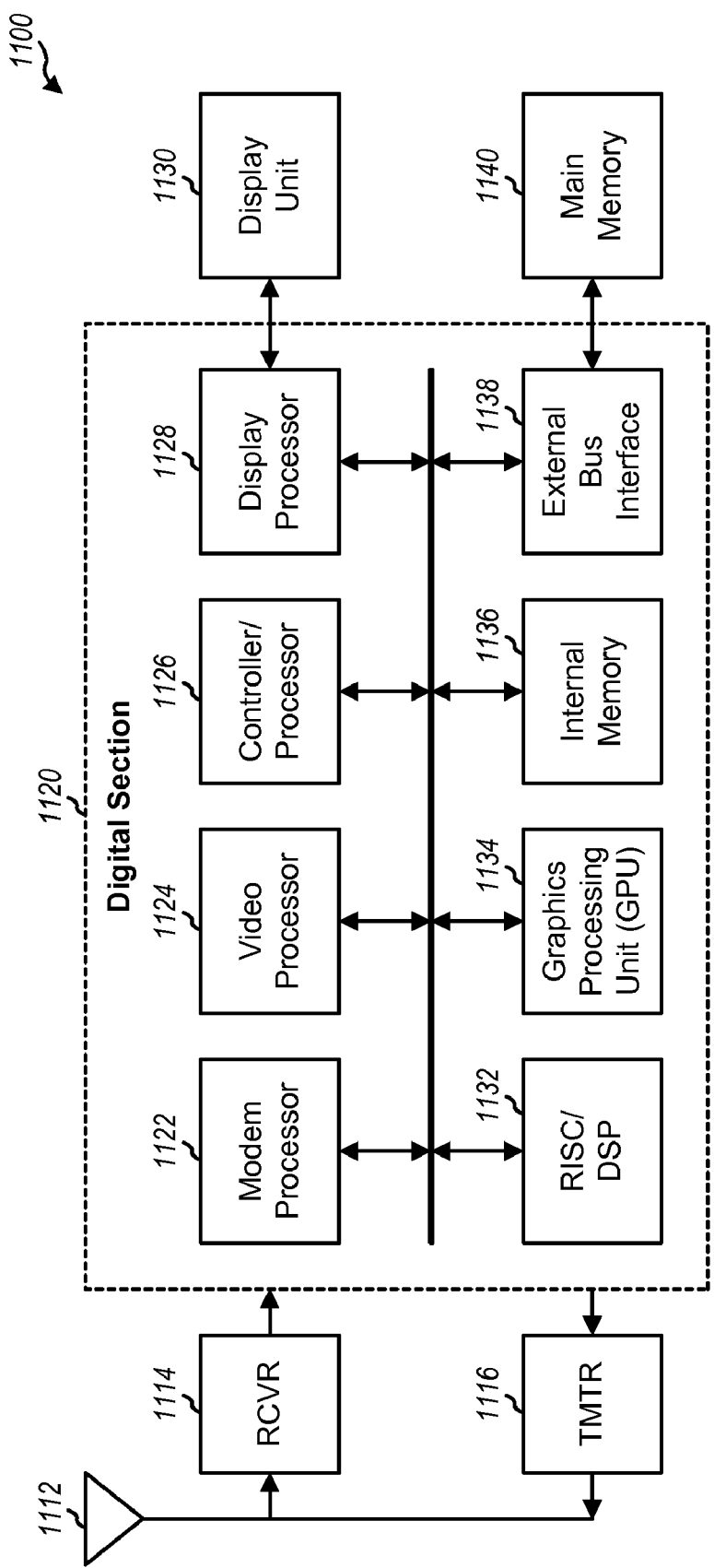
FIG. 11 shows a block diagram of a wireless communication device.

FIG. 11 shows a block diagram of a design of a wireless communication device 1100 in a wireless communication system. Wireless device 1100 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 1100 is capable of providing bi-directional communication via a receive path and a transmit path. On the receive path, signals transmitted by base stations are received by an antenna 1112 and provided to a receiver (RCVR) 1114. Receiver 1114 conditions and digitizes the received signal and provides samples to a digital section 1120 for further processing. On the transmit path, a transmitter (TMTR) 1116 receives data to be transmitted from digital section 1120, processes and conditions the data, and generates a modulated signal, which is transmitted via antenna 1112 to the base stations.

Digital section 1120 includes various processing, interface and memory units such as, for example, a modem processor 1122, a video processor 1124, a controller/processor 1126, a display processor 1128, a reduced instruction set computer/digital signal processor (RISC/DSP) 1132, a GPU 1134, an internal memory 1136, and an external bus interface (EBI) 1138. Modem processor 1122 performs processing for data transmission and reception (e.g., encoding, modulation, demodulation, and decoding). Video processor 1124 performs processing on video content (e.g., still images, moving videos, and moving texts) for video applications such as camcorder, video playback, and video conferencing. Controller/processor 1126 may direct the operation of various processing and interface units within digital section 1120. Display processor 1128 performs processing to facilitate the display of videos, graphics, and texts on a display unit 1130. RISC/DSP 1132 may perform various types of processing for wireless device 1100. For example, GPU 112 in FIG. 3 may be executed in RISC/DSP 1132. GPU 1134 performs graphics processing and may implemented GPU 120 in FIG. 3, all or part of 2-D graphics pipeline 200 in FIG. 2, all or part of filtering unit 600 in FIG. 6, all or part of blending unit 800 in FIG. 8, process 1000 in FIG. 10, etc. Internal memory 1136 stores data and/or instructions for various units within digital section 1120. EBI 1138 facilitates transfer of data between digital section 1120 (e.g., internal memory 1136) and a main memory 1140. Memory 1136 and/or memory 1140 may implement buffers 140 through 148 in FIG. 3.

Digital section 1120 may be implemented with one or more DSPs, micro-processors, RISCs, etc. Digital section 1120 may also be fabricated on one or more application specific integrated circuits (ASICs) and/or some other type of integrated circuits (ICs).

The GPU described herein may be implemented in various hardware units. For example, the GPU may be implemented within ASICs, DSPs, digital signal processing devices (DSPDs), programmable logic devices (PLDs), field programmable gate arrays (FPGAs), processors, controllers, micro-controllers, microprocessors, electronic devices, other electronic units. The GPU may or may not include integrated/embedded memory.

The GPU described herein may be a stand-alone unit or may be part of a device. The device may be (i) a stand-alone IC such as a graphics IC, (ii) a set of one or more ICs that may include memory ICs for storing data and/or instructions, (iii) an ASIC, such as a mobile station modem (MSM), with integrated graphics processing functions, (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A device comprising:
a graphics processing unit (GPU) configured to perform 3-dimensional (3-D) graphics processing in accordance with a 3-D graphics pipeline to render 3-D images, and to perform 2-dimensional (2-D) graphics processing in accordance with a 2-D graphics pipeline to render 2-D images, wherein each of a plurality of stages of the 2-D graphics pipeline is mapped to be performed using at least one of a plurality of stages of the 3-D graphics pipeline, wherein clipping in the 2-D graphics pipeline is mapped to be performed using functions performed by a depth test engine of the 3-D graphics pipeline; and
a memory configured to store data for the GPU.

2. The device of claim 1, wherein the GPU is configured to perform 2-D graphics processing for at least stages three through eight of the 2-D graphics pipeline in OpenVG.

3. The device of claim 1, further comprising:
a GPU driver to perform tessellation for paths and geometry shapes in 2-D graphics.

4. The device of claim 1, wherein the GPU comprises
a vertex shader configured to perform transformation between coordinate systems for 2-D and 3-D graphics.

5. The device of claim 1, wherein the GPU comprises
a primitive processor and a scan converter configured to perform rasterization of primitives in 2-D and 3-D graphics.

6. The device of claim 5, further comprising:
a GPU driver to perform tessellation for paths in 2-D graphics and provide triangle fans, wherein the primitive processor is configured to decompose each triangle fan into at least one triangle, and wherein the scan converter is configured to rasterize each triangle of each triangle fan.

7. The device of claim 1, wherein masking in the 2-D graphics pipeline is mapped to be performed using functions performed by the depth test engine of the 3-D graphics pipeline.

8. The device of claim 7, wherein the depth test engine is further configured to perform scissoring for 2-D graphics.

9. The device of claim 1, wherein the GPU comprises
a depth test engine configured to determine coverage values for paths in 2-D graphics.

10. The device of claim 9, wherein the depth test engine is configured to receive samples within each of at least one triangle for a path in 2-D graphics, to update stencil values for the samples within each triangle, and to determine coverage values for samples based on stencil values for the samples.

11. The device of claim 10, wherein the path covers a plurality of pixels and each pixel is represented with multiple samples, and wherein the depth test engine is configured to determine a coverage value for each pixel in the path based on stencil values for the multiple samples of the pixel.

12. The device of claim 1, wherein the GPU comprises a fragment shader configured to perform texturing for 3-D graphics and paint generation for 2-D graphics.

13. The device of claim 12, wherein the fragment shader is further configured to perform image interpolation for 2-D graphics.

14. The device of claim 1, wherein the GPU comprises a fragment shader configured to perform convolution filtering for 2-D and 3-D graphics.

15. The device of claim 1, wherein the GPU comprises a computation unit configured to perform color conversion for 2-D and 3-D graphics.

16. The device of claim 15, wherein the computation unit comprises
a reciprocal unit configured to receive operands and provide reciprocal of the operands,
a gamma look-up table configured to receive linear color values and provide non-linear color values, and
a degamma look-up table configured to receive non-linear color values and provide linear color values.

17. The device of claim 1, wherein the GPU comprises a blending unit configured to perform blending for 2-D and 3-D graphics.

18. The device of claim 17, wherein the blending unit supports a plurality of blending modes, each blending mode associated with a respective sequence of instructions.

19. The device of claim 18, wherein an instruction for blending includes at least one of a first field indicating one of a plurality of blending operations, a second field indicating one of a plurality of locations for a source color value, a third field indicating one of a plurality of locations for a destination color value, a fourth field indicating one of a plurality of source blending factors, a fifth field indicating one of a plurality of destination blending factors, and a sixth field indicating one of a plurality of locations for a result.

20. The device of claim 1, wherein the GPU comprises a rasterizer configured to compute coordinates of pixels inside a primitive for 2-D graphics, the coordinates being used to look up at least one of a line stipple pattern, a source buffer, and a destination buffer.

21. The device of claim 1, wherein the GPU comprises a rasterizer configured to determine color values for pixels inside a primitive for gradient fill in 2-D graphics.

22. A method comprising:
performing 3-dimensional (3-D) graphics processing in accordance with a 3-D graphics pipeline to render 3-D images utilizing a graphics processing unit (GPU); and
performing 2-dimensional (2-D) graphics processing in accordance with a 2-D graphics pipeline to render 2-D images utilizing the GPU, wherein each of a plurality of stages of the 2-D graphics pipeline is mapped to be performed using at least one of a plurality of stages of the 3-D graphics pipeline, wherein clipping in the 2-D graphics pipeline is mapped to be performed using functions performed by a depth test engine of the 3-D graphics pipeline.

23. The method of claim 22, wherein masking in the 2-D graphics pipeline is mapped to be performed using functions performed by the depth test engine of the 3-D graphics pipeline.

24. An apparatus comprising:
means for performing 3-dimensional (3-D) graphics processing in accordance with a 3-D graphics pipeline to render 3-D images utilizing a graphics processing unit (GPU); and
means for performing 2-dimensional (2-D) graphics processing in accordance with a 2-D graphics pipeline to render 2-D images utilizing the GPU, wherein each of a plurality of stages of the 2-D graphics pipeline is mapped to be performed using at least one of a plurality of stages of the 3-D graphics pipeline, wherein clipping in the 2-D graphics pipeline is mapped to be performed using functions performed by a depth test engine of the 3-D graphics pipeline.

25. The apparatus of claim 24, wherein masking in the 2-D graphics pipeline is mapped to be performed using functions performed by the depth test engine of the 3-D graphics pipeline.

26. The apparatus of claim 24, wherein the means for performing 2-D graphics processing comprises means for determining coverage values for pixels within paths in 2-D graphics using a rasterization stage and a depth test stage of the 3-D graphics pipeline.

27. The apparatus of claim 24, wherein the means for performing 3-D graphics processing comprises means for performing fragment shading for 3-D graphics in one of the plurality of stages of the 3-D graphics pipeline, and wherein the means for performing 2-D graphics processing comprises means for performing paint generation in one of the plurality of stages of the 2-D graphics pipeline, the stage for paint generation being mapped to the stage for fragment shading.

28. The apparatus of claim 27, wherein the means for performing 2-D graphics processing further comprises means for performing image interpolation in another one of the plurality of stages of the 2-D graphics pipeline, the stage for image interpolation being mapped to the stage for fragment shading.

29. The apparatus of claim 24, wherein the means for performing 3-D graphics processing and the means for performing 2-D graphics processing comprise means for performing blending for 2-D and 3-D graphics in accordance with a plurality of blending modes, each blending mode associated with a respective sequence of instructions.

30. A wireless device comprising:
a graphics processing unit (GPU) configured to perform 3-dimensional (3-D) graphics processing in accordance with a 3-D graphics pipeline to render 3-D images, and to perform 2-dimensional (2-D) graphics processing in accordance with a 2-D graphics pipeline to render 2-D images, wherein each of a plurality of stages of the 2-D graphics pipeline are performed using at least one processing unit used for at least one of a plurality of stages of the 3-D graphics pipeline, wherein clipping in the 2-D graphics pipeline is mapped to be performed using functions performed by a depth test engine processing unit of the 3-D graphics pipeline; and
a memory configured to store data for the GPU.

* * * * *